United States Patent
Berges

[15] 3,698,526
[45] Oct. 17, 1972

[54] FRICTION LINING FOR BRAKES, CLUTCHES AND LIKE APPARATUS

[72] Inventor: Wilhelm Berges, Hauptstrasse 135 B, Marienheide/Rheinland, Germany

[22] Filed: Jan. 5, 1970

[21] Appl. No.: 611

[30] Foreign Application Priority Data

Jan. 7, 1969 Germany..........P 19 00 459.2

[52] U.S. Cl. ..........................192/107 M, 188/251 M
[51] Int. Cl. ...............................................F16l 13/60
[58] Field of Search..192/107 M; 188/251 A, 251 M, 188/255

[56] References Cited

UNITED STATES PATENTS

| | | | |
|---|---|---|---|
| 1,239,448 | 9/1917 | Armbrust | 188/255 |
| 2,554,548 | 4/1951 | Albagnac | 192/107 M |
| 2,122,405 | 7/1938 | Bockius et al. | 192/107 M |
| 2,355,419 | 8/1944 | Bruce | 192/107 M |

Primary Examiner—Benjamin W. Wyche
Assistant Examiner—Randall Heald
Attorney—Holman & Stern

[57] ABSTRACT

Friction lining for brakes and clutches, comprising organically bonded friction material and sintered and metallically bonded friction material members or particles, embedded in the aforementioned friction material and mounted on a metallic friction lining support, the sintered member or members are mounted on a separate metallic support and the support or supports are mounted directly on the friction lining support.

5 Claims, 7 Drawing Figures

Inventor:
WILHELM BERGES

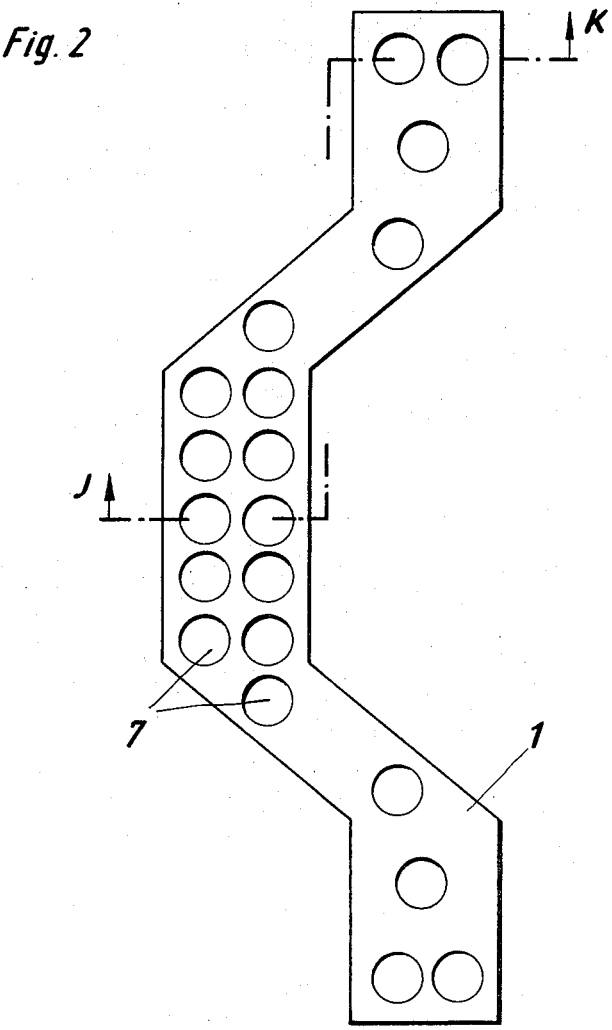

PATENTED OCT 17 1972 3,698,526

Inventor:
WILHELM BERGES
Holman, Glascock, Downing / Seebold
ATTORNEYS

FRICTION LINING FOR BRAKES, CLUTCHES AND LIKE APPARATUS

BACKGROUND OF THE INVENTION

The invention relates to a friction lining for brakes, clutches and like apparatus, comprising organically bonded friction material and sintered, metallically bonded friction material members or particles embedded in the aforementioned friction material and being mounted together on a metallic friction lining support or shoe.

The constantly increasing demands on the performance of friction linings and the need for rapidly dissipating the heat developed by the brake have led to the development of friction linings comprising organically bonded friction material and sintered members embedded in said frictional material, said sintered members having a good thermal conductivity. It has also been recognized as advisable to mount the sintered members directly on the metallic friction lining support because this procedure permits particularly good heat dissipation from the sintered member to the friction lining support. It was furthermore found that linings of the kind mentioned heretofore have favorable wear characteristics and moreover treat the mating friction materials very gently. It has also been found that owing to the high mechanical stresses the sintered material is endangered by breaking or canting in severe driving operation. It is the object of the invention to eliminate this disadvantage.

According to the invention the sintered member or sintered members are mounted on a separate metallic support and that furthermore the support or supports of metal are mounted directly on the friction lining support. The sintered member or members may be mounted by sintering or by means of a plastics adhesive. To this end, each sintered member may comprise an actual metallic support or a plurality of sintered members may be provided with a common metallic support. It is also possible for a plurality of sintered members to be mounted by means of their own metallic support on a common metallic support by means of welding. For friction linings of large surface area the invention provides the mounting of a plurality of sintered members on a common metallic support. In a preferred embodiment of the construction disclosed hereinbefore a sintered member is disposed in the middle zone of the friction lining and one sintered member each is disposed laterally in the zone of each rivet hole, the middle and lateral sintered member being joined by diagonally disposed connecting webs of the metallic support. According to the invention it is also possible to join the middle sintered member and the lateral sintered members by means of rectangularly disposed connecting webs of the metallic support. The connecting webs may also have any other desired shape. It is also not absolutely essential for the laterally disposed sintered members to be always situated in the zone of a rivet hole.

According to the invention, the metallic support or metallic supports may be provided with several apertures in the manner of a perforated plate and being provided for the purpose of anchoring the sintered members.

The construction according to the invention makes it possible for the sintered members to be independently produced in such a manner that they form an intimate and indestructable bond with the metallic support. This procedure provides the sintered member with a high tensile reinforcement, capable of substantially increasing the tensile and tear strength of the sintered member, so that said sintered member is also provided with a substantial bending stiffness. The metallic base also provides particularly favorable conditions for heat dissipation. After installation of the sintered members into the friction lining of organically bonded material, a particularly strong bond is produced between the organically bonded friction material and the sintered members so that the wear resistance of the friction lining and its heat dissipation characteristics are substantially improved. The rivet holes provided in the sintered members permit riveting of the sintered members on the brake shoes or other supports in the same manner in which this is performed for the organic part of the lining. The rivet holes may also be used to enable two retaining pins, provided both in the pre-molding die as well as in the hot-molding die, to engage in said holes and thus to locate the position of the sintered molding in the lining during the appropriate manufacturing stages. The invention also produces a substantial advantage in manufacture. Since the metallic support for the sintered members may be constructed from sheet steel, its thickness is substantially less than that of the sintered parts thus enabling the organic lining material to form bridges between the sintered parts or sintered members.

In a particular embodiment the sheet steel support is so formed that cutting from steel strip involves practically no cutting losses.

An embodiment of the invention will now be described by way of example with reference to the accompanying drawings in which:

FIG. 2 is a plan view of the metallic support, employed in the friction lining according to FIG. 1;

FIG. 3 is a sectional view corresponding to the sectional line J — K of FIG. 2;

Figure 1:
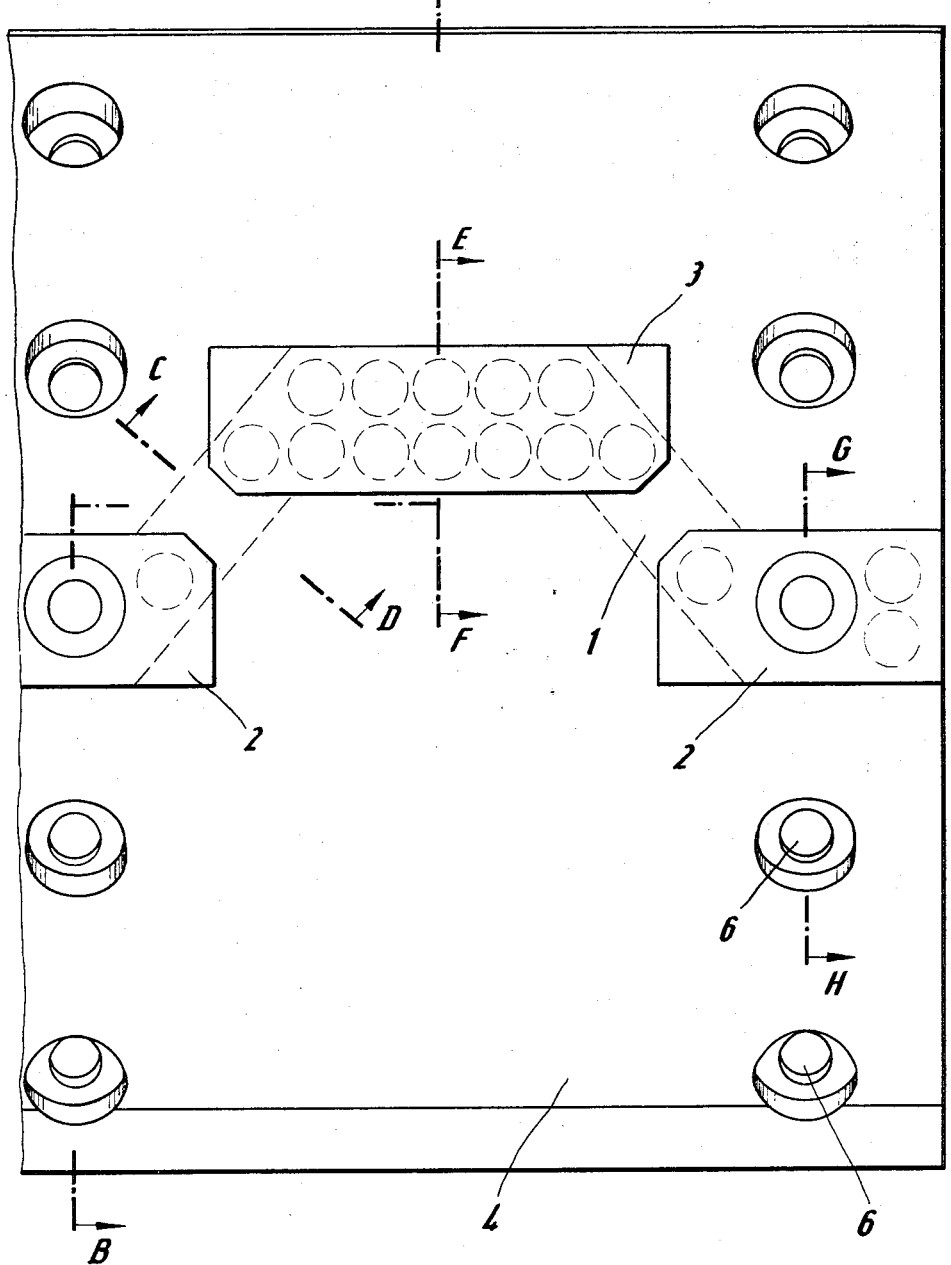
FIG. 1 is a plan view of a brake lining constructed in accordance with the invention.
Figure 4:
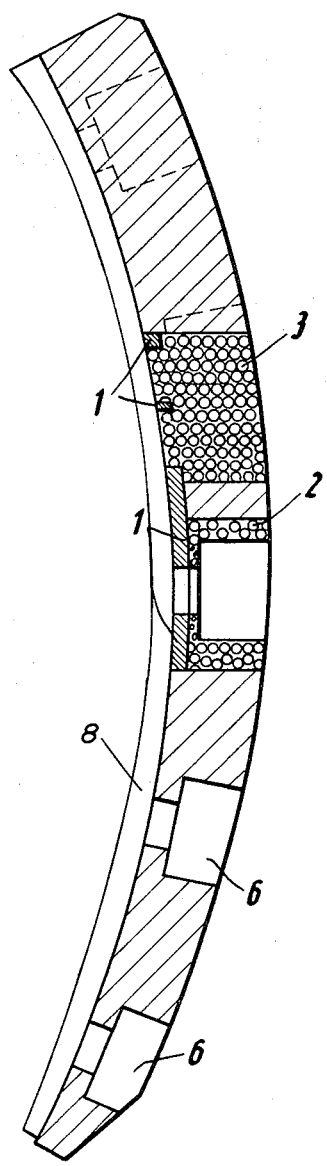
FIG. 4 is a sectional view corresponding to the sectional line A — B in FIG. 1.

Referring to the drawings the friction lining has the conventional rivet holes 6. The friction lining comprises organically bonded friction material 4 into which sintered members 2, 3 are embedded. Said sintered members 2, 3 are mounted on a common support 1 of sheet steel whose shape is indicated in FIG. 2. As shown in FIGS. 2 and 3, the metallic support 1 is partially provided with apertures 7, disposed in the manner of a perforated plate. Said apertures 7 serve to anchor the sintered material of the sintered members 2 and 3. The sintered members 2, 3 are embedded in the manner shown in the sectional view of FIG. 4. This in particular discloses on the lefthand side the sectioned parts of the metallic support 1. To the extent to which apertures 7 are provided in the aforementioned support 1, they are filled by the compound of the sintered member. It can be clearly seen that this initially produces a very resistant bond between the metallic support 1 and the material of the sintered members 2, 3 which together are embedded in the organically bonded friction material 4. Reference numeral 8 indicates a friction lining support of a type already known in the art.

Figure 5:
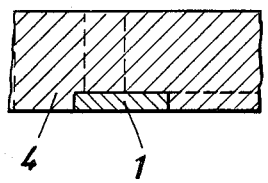
FIG. 5 is a sectional view corresponding to the sectional line C — D in FIG. 1.

FIG. 5 is a fragmentary view in section to indicate in sectional form the diagonally extending web of the metallic support 1. Said web of the support 1 is completely surrounded at the top and laterally by the friction material so that the two vertical edges of the sintered members are not visible and therefore appear in broken lines in the drawing.

Figure 6:
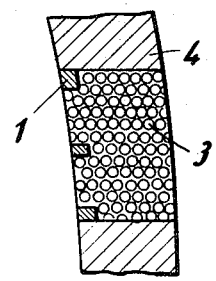
FIG. 6 is a sectional view corresponding to the sectional line E — F of FIG. 1 which in turn corresponds partially to the sectional line A — B.

FIG. 6 shows the method of anchoring the sintered member 3 to the metallic support 1.

Figure 7:
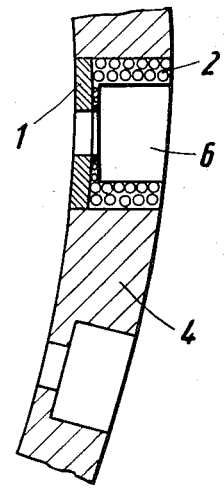
FIG. 7 shows a sectional view corresponding to the sectional line G — H of FIG. 1 to indicate the sintered members disposed laterally.

FIG. 7 shows the corresponding bond between the support 1 and the sintered member 2 which in turn is surrounded by the organically bonded friction material.

I claim:

1. Friction lining for brakes and clutches, comprising organically bonded friction material and sintered and metallically bonded friction material members or particles, embedded in the aforementioned friction material and mounted on a metallic friction lining support, characterized in that the sinterd member or members are mounted on a separate metallic support, the support or supports are mounted directly on the friction lining support, and the metallic support or supports is provided with a plurality of apertures in the manner of a perforated plate and serving to anchor the sintered member or members.

2. Friction lining for brakes and clutches, comprising organically bonded friction material and a plurality of sintered and metallically bonded friction material members embedded in the first mentioned friction material and mounted on a metallic friction lining support, wherein the sintered members are mounted on a separate common metallic support and said separate common metallic support is mounted directly on said friction lining support, said common metallic support having a middle zone and two end portions, said middle zone being connected to said end portions by connecting webs.

3. Friction lining for brakes and clutches, comprising organically bonded friction material and sintered and metallically bonded friction material members or particles, embedded in the aforementioned friction material and mounted on a metallic friction lining support, characterized in that the sintered member or members are mounted on a separate metallic support, the support or supports being mounted directly on the friction lining support, a plurality of sintered members with their own metallic support being mounted by welding onto a common metallic support.

4. Friction lining for brakes and clutches, comprising organically bonded friction material and sintered and metallically bonded friction material members or particles, embedded in the aforementioned friction material and mounted on a metallic friction lining support, characterized in that the sintered member or members are mounted on a separate metallic support, the support or supports are mounted directly on the friction lining support, a sintered member in the middle part of the friction lining and one sintered member each are disposed laterally in the zone of one rivot hole each and the middle and lateral sintered members are joined by diagonally disposed connecting webs of the metallic support.

5. Friction lining according to claim 4, characterized in that the middle sintered member and the lateral sintered members are joined by rectangularly disposed connecting webs of the metallic support.

* * * * *